US009928107B1

(12) United States Patent
Vincent

(10) Patent No.: US 9,928,107 B1
(45) Date of Patent: Mar. 27, 2018

(54) FAST IP MIGRATION IN A HYBRID NETWORK ENVIRONMENT

(75) Inventor: Pradeep Vincent, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 13/435,235

(22) Filed: Mar. 30, 2012

(51) Int. Cl.
G06F 15/173 (2006.01)
G06F 9/48 (2006.01)
H04L 29/08 (2006.01)

(52) U.S. Cl.
CPC .......... *G06F 9/4856* (2013.01); *H04L 67/148* (2013.01)

(58) Field of Classification Search
CPC ........... H04L 49/9094; H04L 29/08846; G06F 9/455; G06F 9/4555; G06F 3/0662; G06F 3/0667; G06F 2009/455
USPC .......... 709/226, 228–229, 213, 239; 34/226, 34/228–229, 213, 239
See application file for complete search history.

(56) References Cited

U.S. PATENT DOCUMENTS

| 5,325,362 | A | 6/1994 | Aziz | |
| 6,771,381 | B1* | 8/2004 | Klein | 358/1.15 |
| 7,146,432 | B2* | 12/2006 | Antes et al. | 709/239 |
| 8,005,013 | B2* | 8/2011 | Teisberg et al. | 370/254 |
| 8,027,342 | B2* | 9/2011 | Venkitaraman et al. | 370/392 |
| 8,095,929 | B1 | 1/2012 | Ji et al. | |
| 8,102,781 | B2 | 1/2012 | Smith | |
| 8,108,912 | B2 | 1/2012 | Ferris | |
| 8,194,680 | B1* | 6/2012 | Brandwine et al. | 370/398 |
| 8,799,920 | B2 | 8/2014 | Lubsey et al. | |
| 8,880,773 | B2 | 11/2014 | Costa | |
| 9,250,863 | B1 | 2/2016 | Vincent et al. | |
| 2004/0190557 | A1* | 9/2004 | Barron | 370/496 |
| 2004/0218611 | A1 | 11/2004 | Kim | |
| 2004/0236829 | A1* | 11/2004 | Xu et al. | 709/204 |
| 2004/0267920 | A1* | 12/2004 | Hydrie et al. | 709/223 |
| 2006/0075199 | A1* | 4/2006 | Kallahalla | G06F 3/0608 711/153 |

(Continued)

OTHER PUBLICATIONS

Office Action for U.S. Appl. No. 13/435,220, dated Mar. 25, 2015, Pradeep Vincent, "Live Migration of Virtual Machines in a Hybrid Network Environment", 34 pages.

(Continued)

*Primary Examiner* — Mohamed Wasel
*Assistant Examiner* — Tsung Wu
(74) *Attorney, Agent, or Firm* — Lee & Hayes, PLLC

(57) ABSTRACT

Technologies are described herein for migrating network addresses between host computers in a hybrid network environment. Before migrating a network address between a source host computer in a first network and a target host computer in a second network, potentially affected host computers in the networks are notified of the upcoming migration. This may cause an address translation module of an affected host computer to enter a fast polling mode. The networking infrastructures of the first and second networks are then reconfigured to effect transfer of the network address. This may include updating overlay IP mappings for the network address being migrated to point to the target host computer. Finally, the affected host computers are notified that migration of the network address is complete, causing the address translation module of the affected host computer to stop fast polling and return to normal operation with update mappings.

24 Claims, 8 Drawing Sheets

(56) References Cited

U.S. PATENT DOCUMENTS

| | | |
|---|---|---|
| 2007/0079307 A1 | 4/2007 | Dhawan et al. |
| 2007/0112975 A1 | 5/2007 | Cassar |
| 2007/0280243 A1* | 12/2007 | Wray et al. ............... 370/392 |
| 2008/0071915 A1* | 3/2008 | Gbadegesin ............... 709/228 |
| 2008/0155537 A1 | 6/2008 | Dinda et al. |
| 2008/0163239 A1 | 7/2008 | Sugumar et al. |
| 2008/0219268 A1 | 9/2008 | Dennison |
| 2008/0222375 A1 | 9/2008 | Kotsovinos et al. |
| 2008/0222638 A1 | 9/2008 | Beaty et al. |
| 2008/0295096 A1 | 11/2008 | Beaty et al. |
| 2009/0007106 A1 | 1/2009 | Araujo, Jr. et al. |
| 2009/0132840 A1 | 5/2009 | Talwar et al. |
| 2009/0187775 A1 | 7/2009 | Ishikawa |
| 2009/0198817 A1 | 8/2009 | Sundaram et al. |
| 2009/0199291 A1 | 8/2009 | Hayasaka et al. |
| 2009/0328038 A1* | 12/2009 | Yamada et al. ............... 718/1 |
| 2010/0071025 A1 | 3/2010 | Devine et al. |
| 2010/0191854 A1 | 7/2010 | Isci et al. |
| 2010/0242045 A1 | 9/2010 | Swamy et al. |
| 2010/0287548 A1* | 11/2010 | Zhou et al. ............... 718/1 |
| 2010/0299666 A1* | 11/2010 | Agbaria et al. ............... 718/1 |
| 2010/0322255 A1 | 12/2010 | Hao et al. |
| 2011/0022695 A1 | 1/2011 | Dalal et al. |
| 2011/0022812 A1 | 1/2011 | van der Linden et al. |
| 2011/0030037 A1 | 2/2011 | Olshansky et al. |
| 2011/0075664 A1 | 3/2011 | Lambeth et al. |
| 2011/0161491 A1 | 6/2011 | Sekiguchi |
| 2011/0185073 A1* | 7/2011 | Jagadeeswaran et al. .... 709/228 |
| 2011/0205904 A1* | 8/2011 | Nakagawa ............... 370/241 |
| 2011/0219372 A1 | 9/2011 | Agrawal et al. |
| 2011/0246669 A1* | 10/2011 | Kanada et al. ............... 709/238 |
| 2011/0264740 A1 | 10/2011 | Diachina et al. |
| 2011/0274108 A1 | 11/2011 | Fan |
| 2011/0289333 A1 | 11/2011 | Hoyer et al. |
| 2012/0017009 A1* | 1/2012 | Short et al. ............... 709/238 |
| 2012/0023223 A1 | 1/2012 | Branch et al. |
| 2012/0030306 A1* | 2/2012 | Kami ............... 709/213 |
| 2012/0054367 A1* | 3/2012 | Ramakrishnan et al. .... 709/242 |
| 2012/0096271 A1* | 4/2012 | Ramarathinam et al. .... 713/172 |
| 2012/0158976 A1 | 6/2012 | Van der Merwe et al. |
| 2012/0163388 A1 | 6/2012 | Goel et al. |
| 2012/0166644 A1 | 6/2012 | Liu et al. |
| 2012/0246282 A1 | 9/2012 | Oguchi |
| 2012/0250682 A1 | 10/2012 | Vincent et al. |
| 2012/0278804 A1 | 11/2012 | Narayanasamy et al. |
| 2012/0303799 A1 | 11/2012 | Hadas et al. |
| 2012/0311568 A1* | 12/2012 | Jansen ............... 718/1 |
| 2013/0031544 A1* | 1/2013 | Sridharan ............ G06F 11/203 718/1 |
| 2013/0179895 A1 | 7/2013 | Calder et al. |
| 2013/0238786 A1* | 9/2013 | Khesin ............... 709/224 |

OTHER PUBLICATIONS

Office Action for U.S. Appl. No. 13/435,257, dated Jan. 15, 2015, Pradeep Vincent, "Secure Tunnel Infrastructure Between Hosts in a Hybrid Network Environment", 20 pages.

U.S. Official Action dated Mar. 20, 2014 in U.S. Appl. No. 13/435,257, filed Mar. 30, 2012, First Named Inventor: Pradeep Vincent.

Office Action for U.S. Appl. No. 12/980,270, filed Dec. 28, 2010, First Named Inventor: Pradeep Vincent.

Office Action for U.S. Appl. No. 12/980,270, filed Dec. 28, 2010. First named Inventor Pradeep Vincent.

Web article: "Windows Server® 2008 R2 Hyper-V™ Live Migration" [online] [retrieved on: Oct. 22, 2013] retrieved from: http://go.microsoft.com/fwlink/?LinkId=139667 , 18 pps.

Harvan, M. "Xen Live Migration", Networks and Distributed Systems Seminar, Apr. 24, 2006, 25 pps.

U.S. Official Action dated Sep. 9, 2013 in U.S. Appl. No. 13/435,257, filed Mar. 30, 2012, First Named Inventor: Pradeep Vincent.

\* cited by examiner

FAST IP MIGRATION IN A HYBRID NETWORK ENVIRONMENT

BACKGROUND

A hybrid network combines elements of public networks and private networks together to deliver a composition of services and resources to the end user. In one form, a hybrid network may comprise a virtual private cloud ("VPC"), wherein the application services and computing resources are hosted by a service provider in a public network, but are segregated and secured for a particular customer. A virtual network is overlaid on a substrate network and managed so that the computing resources attached to the virtual network appear to be part of a customer's private network. In one configuration, a VPN or other secure channel through the public network(s) is established between the customer and the service provider. Packets from the private network are routed over the VPN to the service provider. There, the service provider translates the packets and routes them to proper host computer systems. In another example, the hybrid network may combine any number of computing resources from the private network(s) with other resources hosted in the public network to provide the combined application services and data to the customer.

Computing resources in the public, private, or hybrid network environments may be implemented using virtualization technologies. Virtualization allows a single physical server, or "host," to host one or more instances of virtual machines that appear to operate as independent computing devices to end users. With virtualization, the single server can execute a variety of platforms and operating systems to deliver different application services and other processing resources. In addition, virtualization allows computing resources to be easily scalable through the migration of virtual machines from one host to another, or by replicating the virtual machine(s) across a number of hosts, providing increased availability and redundancy.

In some instances, it may be desired to migrate a virtual machine from one host to a different host through a process known as "live migration." In live migration, the state of the source virtual machine is replicated from a primary host to a target virtual machine provisioned on a secondary host while the source virtual machine continues to operate on the primary host. This may be achieved using a pre-copy approach in which pages of the source virtual machine's memory are iteratively copied from the primary host to the secondary host, all without stopping the execution of the source virtual machine being migrated. Memory pages "dirtied" by the operation of the source virtual machine are copied again in rounds, until nearly all of the memory pages have been copied to the secondary host computer. At that point, the execution of the source virtual machine on the primary host is paused, and the remaining dirty memory pages are copied to the secondary host computer along with the CPU state and other state information of the source virtual machine on the primary host computer. The replicated target virtual machine may then be started on the secondary host computer in order to provide the services of the migrated source virtual machine.

In addition to the migration of the state of the virtual machine, additional resources may also be migrated before or during the live migration, including locally attached peripheral or storage devices, network connections and addresses, and the like. Migrating an entire virtual machine, along with the OS and all of its applications as one unit, may avoid many of the difficulties involved with process-level migration approaches. In addition, the downtime of the migrated virtual machine may be very small, on the order of 100 to 200 milliseconds, thus maintaining high availability of the application services provided by the migrated virtual machine.

While live migration is a powerful tool in the administration of computing resources in a network environment, the process of performing live migration of virtual machines in a hybrid network presents special challenges. For example, migrating a virtual machine from a host in the private network to a host in the public network or VPC may introduce numerous complications, including hardware incompatibility, virtualization software incompatibility, network address portability, storage device migration, secure communication channel(s) between the host in the private network and the host in the public network, and the like. It is with respect to these and other considerations that the disclosure made herein is presented.

DETAILED DESCRIPTION

Figure 1:
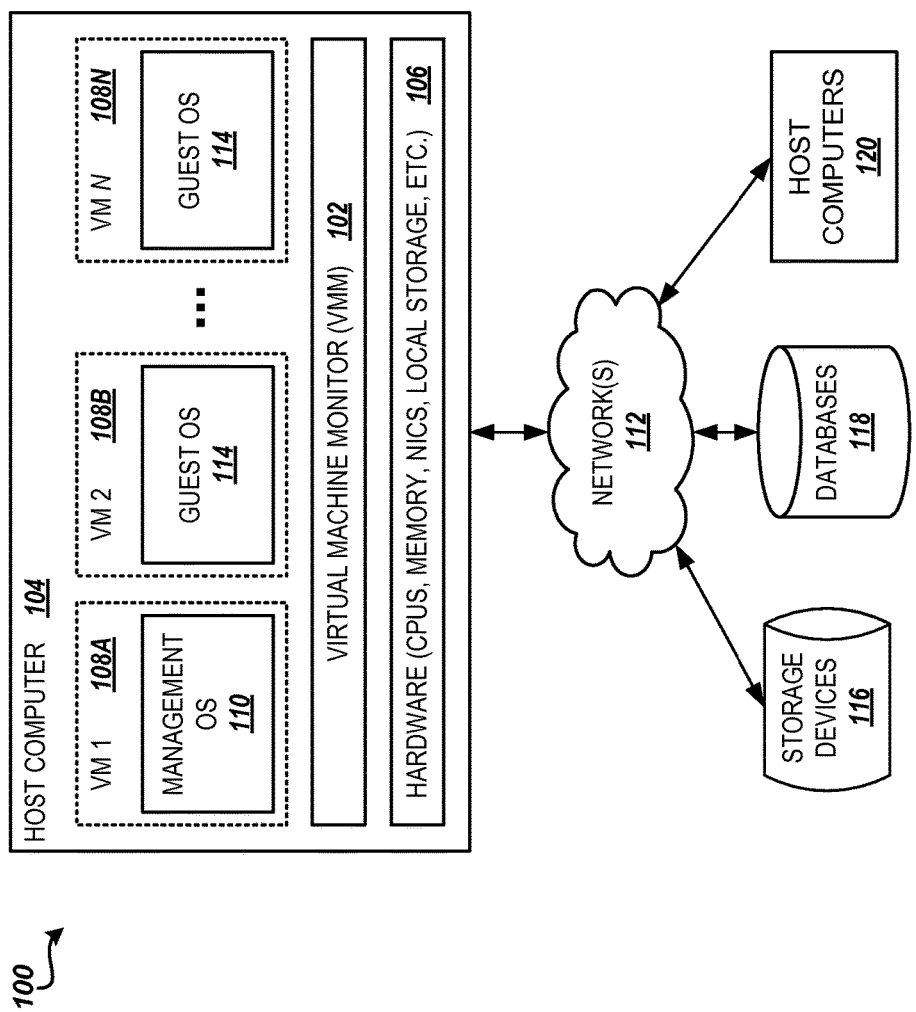
FIG. 1 is a block diagram showing aspects of an illustrative virtualization system, including several software and hardware components provided by embodiments presented herein.

The following detailed description is directed to technologies for performing live migration of virtual machines in a hybrid network environment. Utilizing the technologies described herein, a framework and procedure may be developed for the migration of a virtual machine from a host in one network environment to a host in another, different network environment, while addressing the issues of virtualization software compatibility, network address portability, storage device migration, and establishing a secure communication channel between the source and target hosts for live migration communication. For example, the framework and procedures described herein may be utilized for the migration of a virtual machine from a host in a private network to a host in a public network or vice-versa. According to embodiments a network tunnel infrastructure is established between the first network and the second network. A secure communication channel is then created over the network tunnel infrastructure between a source host computer hosting the virtual machine and a target host computer. Live migration of the virtual machine from the source host computer to the target host computer is performed using the secure communication channel. In addition, the network address(es) of the virtual machine are transferred to the target host computer. The migrated virtual machine may then be resumed on the target host computer.

Further, technologies are described herein for migrating network addresses between host computers in a hybrid network environment. Utilizing the technologies described herein, one or more network addresses may be migrated from a source host computer to a target host computer utilizing a fast IP migration technique, even when the hosts are located on two, disparate networks. This fast IP migration technique may be used in conjunction with the migration of a virtual machine from the source host computer to the target host computer, as described herein, as well as other applications that will become apparent to one skilled in the art. In addition, technologies are described herein for establishing a secure tunnel infrastructure between host computers in a hybrid network environment. Utilizing the technologies described herein, a secure connection between a source host computer and a target host computer located on two, disparate networks may be established utilizing secure network tunnels established between and within the networking infrastructure of the respective networks. This secure tunnel infrastructure may be used to enable the migration of a virtual machine from the source host computer to the target host computer, as described herein, as well as other applications that will become apparent to one skilled in the art.

It should be appreciated that the subject matter presented herein may be implemented as a computer process, a computer-controlled apparatus, a computing system, or an article of manufacture, such as a computer-readable storage medium. These and various other features and embodiments will become apparent from a reading of the following disclosure and a review of the associated drawings.

While the subject matter described herein is presented in the general context of program modules that execute on one or more computing devices, thsose skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a block diagram of an example virtualization architecture 100, according to embodiments. The virtualization architecture 100 includes a virtual machine monitor ("VMM") 102, also referred to as a hypervisor, that allows multiple, independent guest operating systems to concurrently execute on a single host computer 104. The VMM 102 abstracts the hardware of the host computer 104 to create one or more virtual machines ("VMs") 108A-108N (referred to herein generally as virtual machine 108). The VMM 102 may be implemented in the hardware of the host computer 104, or it may be implemented as a software module that executes at a low-level in the host computer to provide services to the virtual machines 108.

One virtual machine 108A may host a management OS 110, also referred to as "domain-0." The management OS 110 may be automatically started by the VMM 102 upon startup of the host computer 104, and may provide administrators of the host computer tools and facilities for managing the VMM and the creation and administration of the other virtual machines 108B-108N. The virtual machine 108A hosting the management OS 110 may execute at a higher privilege level than the other virtual machines 108B-108N, and the management OS may also provide services to the other virtual machines through the VMM 102, such as loading of hardware drivers for the host computer, virtualizing hardware devices within virtual machines 108B-108N, arbitrating access to the hardware of the host computer 104, and the like. In a specific embodiment, the management OS 110 may be a specifically modified version of the LINUX operating system.

The other virtual machines 108B-108N may each run an instance of a guest OS 114 as well as execute one or more applications to provide services to consumers across one or more networks 112. According to one embodiment, the VMM 102 may support both paravirtualized and unmodified guest OSs 114. A paravirtualized guest OS 114 is modified to run in a virtual machine 108 provided by the VMM 102, while an unmodified guest OS 114 may be a version of an operating system that is configured to execute directly on physical hardware. Guest OSs 114 may include the MICROSOFT® WINDOWS® operating system from MICROSOFT Corporation of Redmond, Wash., the ORACLE® SOLARIS operating system from ORACLE Corporation of Redwood City, Calif., the LINUX operating system, the UNIX operating system, the NetBSD operating system, and the like.

It will be appreciated that the embodiments described herein are applicable to other virtualization architectures beyond the virtualization architecture 100 described above and shown in FIG. 1. For example, the management OS 110 may run directly above and control access to the hardware resources 106 of the host computer 104. In addition, while FIG. 1 shows the VMM as separate from the management OS embodiments where the functionality of the management OS and VMM are integrated are within the scope of this disclosure.

According to embodiments, the VMM 102, in conjunction with the management OS 110, controls the allocation and sharing of hardware resources 106 of the host computer 104 amongst the virtual machines 108. The hardware resources 106 may include central processing units ("CPUs") or processors, physical memory, network interface cards ("NICs"), local storage devices, input/output ("I/O") controllers, and the like. Similarly, the VMM 102 may control access of the guest OS 114 and applications executing in the virtual machines 108 to remote storage devices 116, databases 118, other host computers 120, and the like across one or more networks 112. Each virtual machine 108 on the host computer 104 may further be allocated its own set of networking addresses, such as IP addresses, a virtual MAC address, and the like.

Figure 2:
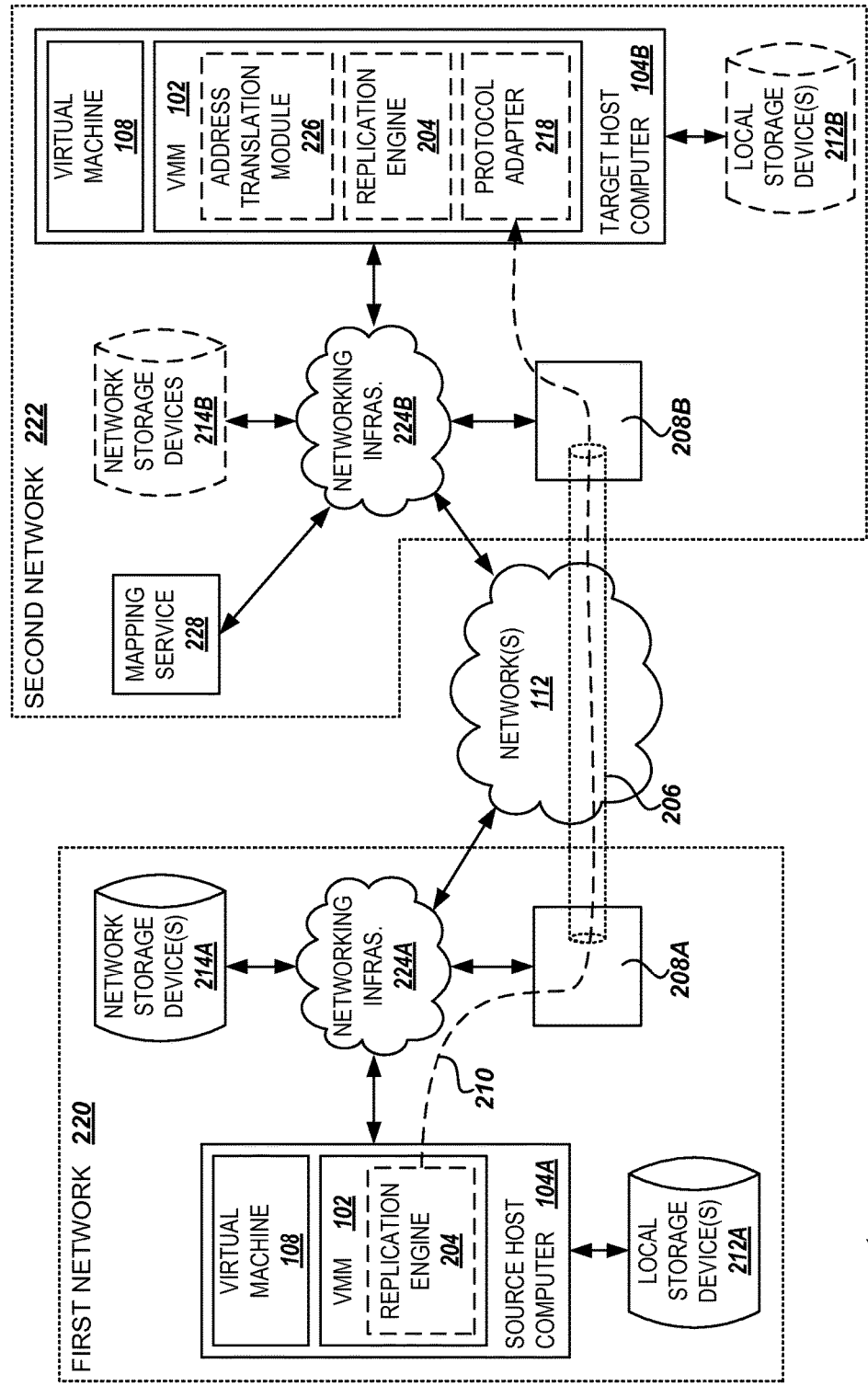
FIG. 2 is a block diagram showing an illustrative hybrid network environment for the migration of a virtual machine from a source host computer to a target host computer, according to embodiments presented herein.

FIG. 2 shows an example computing environment 200 for the migration of a virtual machine 108 from a source host computer 104A located in a first network 220 to a target host computer 104B located in a second network 222. In a specific example, the first network 220 could be a private network operated by an organization. In the same, or another embodiment, the second network 222 could be another private network operated by a different organization. Alternatively, the second network 222 could be a virtual network overlaid upon a substrate network that is operated by a service provider on behalf of a customer, such as a VPC. An address translation module 226 may execute within the VMM 102 running in the target host computer 104B to facilitate implementation of the virtual network. The address translation module 226 changes the address of packets moving through the provider's private network to addresses that are part of the customer's network. It will be appreciated that the embodiments described herein may be equally applicable to the migration of virtual machines 108 in other hybrid network environments, including the migration of a virtual machine from a host computer in a private network to a host computer in a VPC, from a host computer in a public network to a host computer in the private network, and the like.

According to embodiments, the virtual machine 108 is provisioned on the target host computer 104B and the state of the virtual machine 108 is replicated from the source host computer 104A to the target host computer 104B over the network(s) 112 connecting the networking infrastructure 224A of the first network 220 to the networking infrastructure 224B of the second network. The replication of state of the virtual machine 108 between the source host computer 104A and the target host computer 104B may be performed by a replication engine 204 executing on the source host computer 104A and/or the target host computer 104B. The replication engine 204 may represent a component of the VMM 102, a component executing in the management OS 110 or the virtualization architecture 100, or any combination of these and other components on the primary and/or target host computers 104.

As described above, the replication engine 204 may utilize live migration to replicate the state of the virtual machine 108 to the target host computer 104B while the guest OS and applications continue to execute in the source virtual machine. In one embodiment, the replication engine 204 uses a pre-copy approach, in which pages of guest memory from the virtual machine 108 are iteratively copied from the source host computer 104A to the target host computer 104B in rounds. For example, the VMM 102 may maintain a memory page map for the virtual machine 108 that contains a dirty flag for each page of guest memory in the virtual machine indicating whether the memory page is "dirty," i.e., has been written to by the guest OS and applications executing in the virtual machine. At the beginning of the first round of the replication process, the replication engine 204 and/or the VMM 102 may initially flag all pages of guest memory in the memory page map as dirty.

The replication engine 204 may then proceed to asynchronously copy each dirty page of guest memory from the source host computer 104A to the target host computer 104B in the first round, marking the corresponding memory page as clean in the memory page map one the copy is completed.

As the virtual machine 108 continues operation, writes to the memory of the virtual machine are trapped by the VMM 102, and the corresponding memory page is flagged as dirty again in the memory page map. Upon completion of the first round of the replication process, the replication engine 204 begins the next round by copying all dirty pages of guest memory that have been subsequently marked by the VMM 102 as dirty in the memory page map. The replication engine 204 copies the dirty pages of guest memory to the target host computer 104B on a continuous basis, where they are aggregated.

At some point in the replication process, where the replication engine 204 is copying the same dirty pages of guest memory over and over again, for example, the execution of the virtual machine 108 on the source host computer 104A is halted, and the remaining dirty pages of guest memory are copied to the target host computer 104B along with the final state of the CPU, the VM, network connections, device status, and the like. Upon receiving the last dirty pages of guest memory and the CPU, VM, network, and device state information, the replication engine 204 and/or the VMM 102 executing on the target host computer 104B apply the aggregated memory pages copied from the source host computer 104A to the memory of the virtual machine 108 on the target host computer 104B. The CPU and virtual machine state for the virtual machine 108 on the target host computer are updated, making the state of the virtual machine on the target host computer 104B synchronized with that of the virtual machine on the source host computer 104A. The virtual machine 108 may then be started on the target host computer 104B in order to provide the services of the migrated virtual machine.

In another embodiment, the replication engine 204 uses a post-copy approach, in which the CPU, VM, network, and device state information of the virtual machine 108 on the source host computer 104A is copied to the target host computer 104B, and all pages of guest memory of the virtual machine on the target host computer 104B are marked as unavailable in the memory page map. The virtual machine 108 is then started on the target host computer 104B. Memory reads by the guest OS running in the virtual machine 108 on the target host computer 104B are trapped by the VMM 102, and the requested page of guest memory is fetched from the source host computer 104A on demand. The replication engine 204 may also asynchronously copy pages of guest memory from the source host computer 104A to the target host computer 104B in the background. It will be appreciated that other methods of migration of the virtual machine 108 from the source host computer 104A to the target host computer 104B may be imagined by one skilled in the art, including a hybrid of the pre-copy and post-copy live migration approaches.

The target host computer 104B in the second network 222 may be selected to host the migrated virtual machine 108 based on suitability and compatibility with the source host computer 104A hosting the virtual machine 108 in the first network 220. Factors used to determine the suitability and compatibility of the target host computer 104B may include the virtualization technology used in the first network 220, version and capabilities of the VMM 102 and replication engine 204 on the source host computer 104A, processor make, model, and version (stepping) of the processors in the source host computer, and the like. In one embodiment, selection of the appropriate target host computer 104B may be performed by a migration management module in the first and/or second networks 220, 222 using discovery APIs implemented on the potential target host computers based on the requirements of the virtual machine 108 to be migrated and parameters regarding the source host computer 104A.

The source host computer 104A and target host computer 104B may be indirectly connected through one or more private and public networks 112, such as the Internet, that connects the networking infrastructure 224A of the first network 220 to that of the second network 222, as further shown in FIG. 2. In addition, the network components and devices making up the networking infrastructure 224A of the first network 220 may be configured such that no direct connectivity is possible between the source host computer 104A and the target host computer 104B in the second network 222. In order to establish a communication channel between the VMM 102 and/or replication engine 204 of the source host computer 104A and that of the target host computer 104B, an appropriate network tunnel 206 may be established between the networking infrastructures 224A, 224B of the first network 220 and the second network. The network tunnel 206 may typically operate in the overlay address space. For example, a border device 208A in the first network 220 having connectivity to the source host computer 104A may establish a network tunnel 206 over the public network(s) 112 with a similar border device 208B in the second network 222 having connectivity with the target host computer 104B. The border devices 208A, 208B may represent virtual private networking ("VPN") servers, routers, switches, and the like, or any combination thereof.

Once the network tunnel 206 is established, a communication channel 210 may be established between the source host computer 104A in the first network 220 and the target host computer 104B in the second network 222 to facilitate live migration traffic between replication engines 204 and/or VMMs 102. In one embodiment, depending upon the type, version, and compatibility of the virtualization environments in the first network 220 and the second network 222, a protocol adaptor 218 may be established somewhere along the communication channel 210 between the primary and target host computers 104A, 104B in order to facilitate live migration between replication engines 204 and/or VMMs 102 utilizing dissimilar protocols. For example, a protocol adaptor 218 may be implemented in the VMM 102 on the target host computer 104B to support migration of the virtual machine 108 to the target host computer using different live migration protocols supported by the replication engine/ VMMs of the source host computer 104A and target host computer.

According to further embodiments, in addition to live migration of the virtual machine 108, other resources may be required to be migrated from the first network 220 to the second network 222. For example, one or more local storage device(s) 212A (referred to herein generally as local storage devices 212) or other peripherals directly connected to the source host computer 104A and utilized by the virtual machine 108 may be replicated or migrated to the second network 222. This may involve migrating the data stored on the local storage device(s) 212A in the first network 220 to similar local storage device(s) 212B in the second network 222 directly connected to the target host computer 104B using any number of "live migration" techniques known in the art in order for the storage devices to be in a consistent state with the virtual machine on the target host computer at the end of the migration process. For example, upon start of the migration process, the local storage devices 212A, 212B may be started in a "synchronous mode," such that all modifications made to the local storage device connected to the source host computer 104A are simultaneously made to the local storage device 212B connected to the target host computer 104B throughout the migration process. In addition, the migration techniques utilized to migrate the local storage device(s) 212 may utilize the same network tunnel 206 established between the first network 220 and the second network 222 for live migration of the virtual machine 108.

Similarly, data from one or more network storage device(s) 214A (referred to herein as network storage devices 214), such as an iSCSI device or a storage-area network ("SAN") target, utilized by the virtual machine 108 on the source host computer 104A may be migrated from the first network 220 to network storage device(s) 214B in the second network 222, as further shown in FIG. 2. Alternatively, appropriate networking infrastructure may be established between the first network 220 and the second network 222 to allow for the data on the network storage device(s) 214 to remain in the first network but be accessible to the virtual machine 108 on the target host computer 104B in the second network once migration is complete.

In addition, the network address(es) allocated to the virtual machine 108, such as any IP addresses, virtual MAC addresses, and/or addresses from other addressing schemes, may be transferred to the target host computer 104B at or near the end of the migration process, in order for the migrated virtual machine to be resumed on the target host computer, including all open/active network connections. According to one embodiment, this may be accomplished through a "fast IP migration" technique that is enabled by a virtual network or overlay network implemented in the networking infrastructure 224A, 224B of the first and/or second networks 220, 222. For example, in an overlay network, connections are typically implemented using stateless tunnels and controlled via a central management server such as a mapping service 228, as shown in FIG. 2. The mapping service 228 maintains mappings between virtual IP and/or MAC addresses to the physical addresses of host computers 104. The host computers 104 may also execute an agent, such as the address translation module 226, that uses information in the mappings obtained from the mapping service 228 to encapsulate and de-capsulate the IP traffic appropriately.

When an IP and/or MAC address assigned to a virtual machine 108 on the source host computer 104A is moved to the target host computer 104B, the mapping service 228 makes the appropriate changes to the virtual IP/MAC to physical host mappings and propagates the changes to all the relevant physical hosts. In order to support fast IP migration, the propagation of the mapping information should complete in a short amount of time, typically in less than 500 milliseconds. In order to facilitate fast IP migration, a number of API calls may be made to the mapping service 228 by the VMMs 102, replication engines 204, and/or other migration management modules responsible for the migration of the virtual machine 108 from the source host computer 104A to the target host computer 104B. In one embodiment the APIs provided by the mapping service 228 may include:

PrepareNetworkMigration (OverlayIP, OverlayMAC, sourceHostID, targetHostID) or PrepareNetworkMigration (MigrationID);

FastMigrate (OverlayIP, OverlayMAC, sourceHostID, targetHostID) or FastMigrate (MigrationID); and CompleteNetworkMigration (OverlayIP, OverlayMAC, sourceHostID, targetHostID) or CompleteNetworkMigration (MigrationID).

The OverlayIP and OverlayMAC parameters specify the IP and/or MAC addresses of the virtual machine 108 to be migrated, while the sourceHostID parameter identifies the source host computer 104A that currently has the IP/MAC address and the targetHostID parameter identifies the target host computer 104B to which the addressed will be migrated. It will be noted that the IP and/or MAC addresses to be migrated belong to the virtual machine 108 and hence are referred to as "overlay IP" and "overlay MAC." The source host computer 104A and target host computer 104B themselves usually have another, physical IP address, referred to as the "substrate IP." The MigrationID parameter may be returned from the first API call and allow identification of the specific migration task in subsequent API calls, i.e. encapsulates a particular combination of the OverlayIP, OverlayMAC, sourceHostID, and targetHostID values related to the migration.

In one embodiment, either the VMM 102 and/or replication engine 204 on the source host computer 104A or other migration management modules coordinating the migration of the virtual machine 108 invokes the PrepareNetworkMigration API before the migration process is started. In response, the mapping service 228 sends a notification message to all host computers 104 that may be affected by the network address migration. In general, this set of host computers 104 comprises the set of host computers hosting virtual machines in the same VPC or virtual network. Additional host computers 104 may be included if advanced features, such as "VPC to VPC" portals, are supported. The address translation modules 226 on the host computers 104 that are notified of the upcoming migration may prepare for the fast IP migration by entering a "fast poll" mode in which the host computer polls the mapping service 228 for mapping updates on a frequent basis, such as every 50 milliseconds. Alternatively, the host computers 104 can utilize a "long poll" methodology to poll for changes in the mappings from the mapping service 228. In another embodiment, the mapping service 228 may also "'push" the changed mappings to the host computers 104. In a further embodiment, host computers 104 hosting virtual machines 108 in the VPC or virtual network may remain in "fast poll" mode continuously.

Next, the VMM 102, replication engine 204, or other migration module on the source host computer 104A may invoke the FastMigrate API during the migration process, causing the mapping service 228 to update the overlay IP mappings for the IP/MAC addresses for the virtual machine 108 to point to the target host computer 104B. The address translation modules 226 on host computers 104 that are operating in the "fast poll" mode may then receive the new mappings very quickly. After the completion of the migration of the virtual machine 108 from the source host computer 104A to the target host computer 104B, either the VMM 102 and/or replication engine 204 on the source host computer 104A or another migration management module in the first or second networks 220, 222 may invoke the CompleteNetworkMigration API. This may cause the mapping service 228 to send a notification message to the affected host computers 104 that the fast IP migration is complete, such that the address translation modules 226 may discontinue the "fast poll" mode and return to normal operation. Additionally, the mapping service 228 may support an AbortMigration (MigrationID) API that allows the changes to the overlay IP mappings associated with the IP migration made by the FastMigrate call to be rolled back and the affected host computers 104 notified appropriately to cancel the "fast poll" mode.

In another embodiment, the mapping service 228 may notify the host computers 104 to support two separate mappings for the network address(es) to be migrated: the first mapping corresponding to the existing mapping of the addresses to the source host computer 104A and the second mapping corresponding to the new mapping of the addresses to the target host computer 104B expected to be valid after the migration of the virtual machine 108 is complete. Upon receiving this notification, the address translation modules 226 on the host computers 104 may begin accepting network packets addressed from the network address(es) from both the source host computer 104A and the target host computer 104B during the migration of the virtual machine 108. In addition, network packets addressed to the network address(es) may be replicated and a copy sent to both the source host computer 104A and the target host computer 104B simultaneously.

In further embodiments, until migration of the virtual machine 108 is complete, the network packets received by the address translation module 226 and/or the VMM 102 on the source host computer 104A will be forwarded to the virtual machine, and the packets arriving at the target host computer 104B will be dropped. Once migration of the virtual machine 108 to the target host computer 104B is complete, the network packets arriving at the source host computer 104A will be dropped and the packets arriving at the target host computer will be forwarded by the address translation module 226 and/or the VMM 102 to the migrated virtual machine. In addition, a sequence number may be added to an overlay header added to the network packets which can be used by the address translation module 226 and/or VMM 102 on the target host computer 104B to ensure that duplicate packets are not sent to the virtual machine 108 and that the packets are provided to the virtual machine in the order they were generated. The target host computer 104B could further queue some number of network packets, such as the last 2000 packets received, in order to ensure that no network packets are lost during the cutover of operation of the virtual machine 108 from the source host computer 104A to the target host computer 104B.

The techniques described above for fast IP migration may be further utilized to migrate the network address(es) of the virtual machine 108 from the source host computer 104A to the target host computer 104B in a hybrid network environment, such as that shown in FIG. 2, where the first network 220 is a private network and the second network 222 is a virtual network or VPC, for example. If an overlay network, such as a virtual LAN ("V-LAN"), a multiprotocol label switching ("MPLS") network, or the like, is implemented between the first network 220 and the second network 222, then the techniques described above for fast IP migration may be utilized to migrate the network address(es) of the virtual machine 108 from the source host computer 104A to the target host computer 104B in the second network 222.

If the first network 220 implements an internalized networking infrastructure 224A that supports differing fast IP migration techniques, then the networking infrastructure 224A of the first network containing the source host computer 104A must be able to redirect an individual IP address towards a gateway between the first network and the second network 222, and the networking infrastructure 224B of the second network must be able to direct an individual IP address from the gateway to the target host computer 104B.

The gateway may be the network tunnel 206 implemented by the border devices 208A and 208B described above, or the gateway may be implemented as a VPN tunnel, a peering point, e.g. a VPC direct connect, or the like by other gateway device(s) in the first and/or second networks 220, 222.

When one of the APIs supported by the mapping service 228 is invoked, the API call may be split into internal and external calls. The internal call may be handled by the mapping service 228 in the second network 222 (the virtual network/VPC) while the external call is sent to the equivalent service provided by the networking infrastructure 224A in the first network 220 (the private network) via appropriate middleware. For example, a call to the PrepareNetworkMigration API may result in the host computers 104 and any gateway device(s) of the second network 222 operating in "fast poll" mode, as described above, while the hosts and gateway device(s) of the first network 220 may be placed in a similar "fast poll" mode. If the first network 220 implements a V-LAN, then the external API call to the networking infrastructure 224A of the first network may simply be a "no-operation."

Similarly, a FastMigrate API call may result in an external call to the networking infrastructure 224A of the first network 220 (the private network) that enables redirection of the networking address(es) of the virtual machine 108 from the source host computer 104A towards the gateway, and an internal call that causes the mapping service 228 to push out mapping information that will enable the gateway device(s) in the second network 222 (the virtual network or VPC) to accept networking packets for the IP/MAC addresses and forward them to the target host computer 104B. As a result of the FastMigrate API call, the gateway configuration between the first and second networks 220, 222 may also be changed appropriately. For example, if the gateway device(s) of the second network 222 (the virtual network or VPC) are configured to receive packets for an IP address of 10.10.20.3, and the IP address is being migrated from the second network to the first network 220, then gateway device(s) of the first network (the private network) may be configured to receive traffic for the 10.10.20.3 address, and the gateway devices of the second network can be configured not to receive external traffic for the 10.10.20.3 overlay IP address.

In a further embodiment, a redirection scheme is implemented in the first network 220, wherein the source host computer 104A redirects network packets sent to the network address(es) of the virtual machine 108 to the target host computer 104B, over the network tunnel 206, for example. The target host computer 104B may then provide the packets to the migrated virtual machine 108 for processing. The redirection scheme may be utilized when a fast IP migration technique or mechanism is not supported by the networking infrastructures 224A, 224B of the first network 220 and/or the second network 222. The network redirection scheme may be temporary until transfer of the network address(es) of the virtual machine 108 to the target host computer 104B can be effected and the change propagated through the network infrastructures 224A, 224B of the first and second networks 220, 222.

Turning now to FIGS. 3 and 5-7, additional details will be provided regarding the embodiments presented herein for performing live migration of virtual machines in a hybrid network environment. It should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Figure 3:
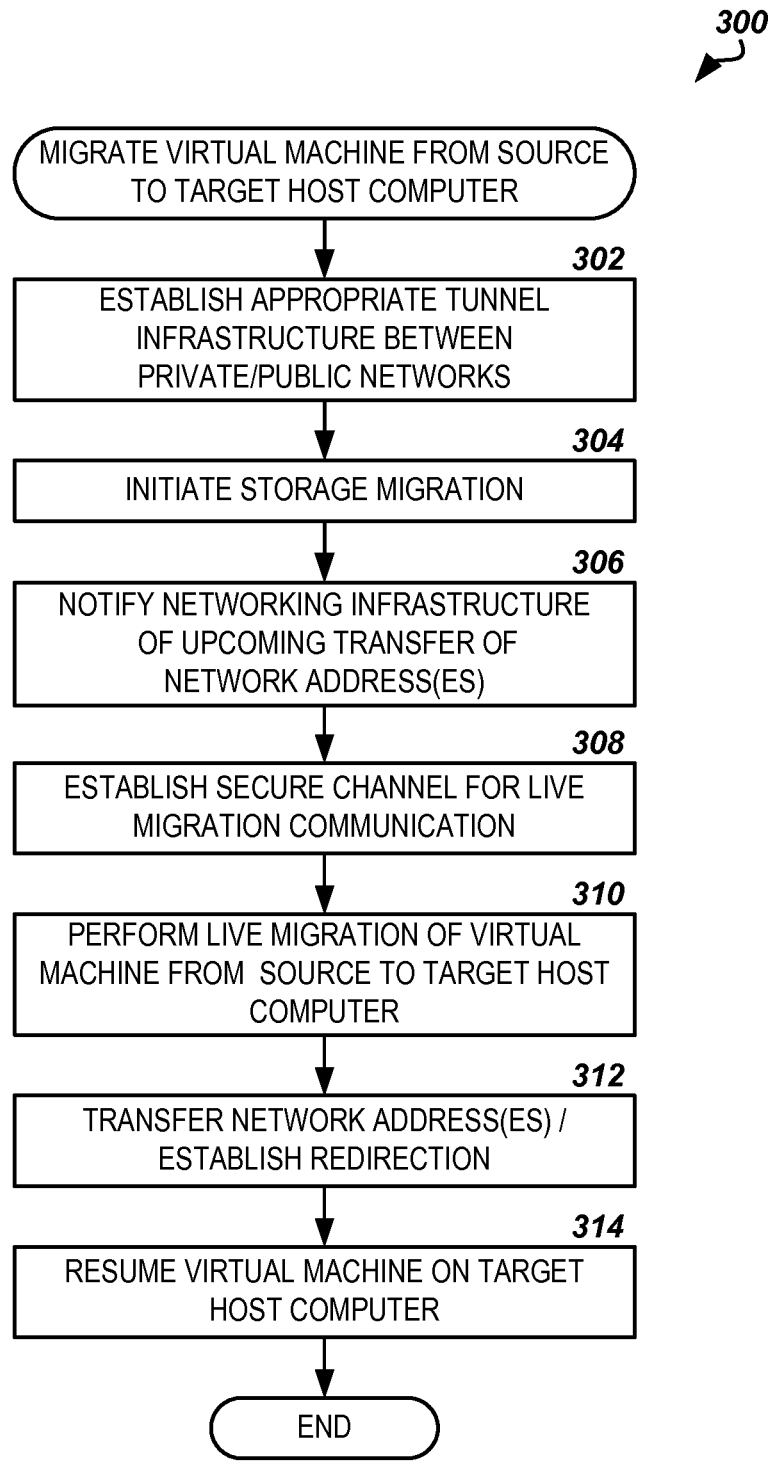
FIG. 3 is a flow diagram showing one method for performing live migration of virtual machines in a hybrid network environment, according to embodiments described herein.

FIG. 3 illustrates one routine 300 for migrating a virtual machine 108 from a source host computer 104A in a first network 220 to a target host computer 104B in a second network 222, according to embodiments described herein. The routine 300 may be performed in part by a combination of the VMM 102 and the replication engine 204 executing on both the source host computer 104A and the target host computer 104B, by a migration management module or components executing in the first and/or second networks 220, 222, by the mapping service 228 and other networking devices and administration components in the first network 220 and the second network 222, and/or by any other combination of modules and components.

The routine 300 begins at operation 302, wherein the appropriate tunnel infrastructure between the network infrastructures 224A, 224B of the first network 220 and the second network 222 are established to support the migration of the virtual machine 108. For live migration (and other forms of migration) of the virtual machine 108, the source and target host computers 104A, 104B must be able to communicate with each other in order to send migration related data and meta-data from the source host computer to the target host computer. In a hybrid network environment, where the first network 220 is a private network and the second network 222 is a public network, a virtual network, or a VPC, for example, the components and devices making up the networking infrastructure 224A in the first network 220 may be configured such that no direct connectivity is possible between the source host computer 104A and the target host computer 104B. For example, the physical IP addresses (the substrate IPs) of the source and target host computers 104A, 104B may be in different address spaces, preventing the hosts from communicating directly with each other. Therefore, an appropriate network tunnel 206 may be established between the networking infrastructures 224A, 224B of the first network 220 and the second network 222 to support the migration process.

The appropriate tunnel infrastructure required may depend on the networking infrastructures 224A, 224B, devices, configuration, and capabilities of the first network 220 and the second network 222. For example, a border device 208A in the first network 220 having connectivity to the source host computer 104A may establish a network tunnel 206 over the network(s) 112 with a similar border device 208B in the second network 222 having connectivity with the target host computer 104B using any number of tunneling protocols known in the art. In other examples, connectivity between the source and target host computers 104A, 104B may be established through implementation of a virtual LAN ("V-LAN"), a multiprotocol label switching ("MPLS") network, an overlay network, or the like between the first network 220 and second network 222.

From operation 302, the routine proceeds to operation 304, where any storage migration required from the first network 220 to the second network 222 is initiated. As further discussed above in regard to FIG. 2, any local storage device(s) 212 or network storage device(s) 214 in the first network 220 utilized by the virtual machine 108 may be migrated to the second network 222. This may involve migrating the data from the storage device(s) 212A, 214A in the first network 220 to similar storage device(s) 212B, 214B in the second network 222. For example, the local storage device 212A connected to the source host computer 104A and the local storage device 212B connected to the target host computer 104B may be started in "synchronous mode," such that all modifications made to the local storage device 212A by the virtual machine 108 are simultaneously made to the local storage device 212B throughout the migration process.

In one embodiment, the migration of network storage devices 214 also includes a period of synchronization between the devices. For example, in order to migrate an iSCSI volume in the first network 220 to a virtual volume on a block storage device in the second network 222, a first step may comprise attaching the target host computer 104B in the second network 222 to the iSCSI device in the first network 220 before the migrated virtual machine is resumed. Next, a storage replication process similar to the live migration process described above is initiated to synchronize the data between the iSCSI volume and the virtual volume on the block storage device in the second network 222. This storage replication process may utilize the same network tunnel 206 established between the first network 220 and the second network 222 in operation 302. One the synchronization is complete, the iSCSI device can be detached, and the volume can be discarded.

The routine 300 proceeds from operation 304 to operation 306, where the networking infrastructure responsible for transferring the network address(es) for the virtual machine 108 from the source host computer 104A in the first network 220 to the target host computer 104B in the second network 222 is informed of the upcoming migration of the addresses. For example, as described above in regard to FIG. 2, the VMM 102 and/or replication engine 204 on the source host computer 104A or other migration management modules coordinating the migration of the virtual machine 108 may invoke the PrepareNetworkMigration API of the mapping service before the migration process is started. In response, the mapping service 228 may send a notification message to all host computers 104, gateway device(s), and other servers or devices in the first and second networks 220, 222 that may be affected by the network address migration to prepare for the transfer of the network address(es). For example, the address translation modules 226 on the host computers 104 that are notified of the upcoming migration may prepare for the fast IP migration by entering the "fast poll" mode.

In another embodiment, the PrepareNetworkMigration API call may generate both an internal call to the mapping service 228 in the second network 222 (the virtual network/VPC) and an external call to the equivalent service provided by the networking infrastructure 224A in the first network 220 (the private network). The internal call may result in the host computers 104 and any gateway device(s) of the second network 222 operating in "fast poll" mode, as described above, while the external call may result in the hosts and gateway device(s) of the first network 220 being placed in a similar "fast poll" mode. If the first network 220 implements a V-LAN, then the external API call to the networking infrastructure 224A of the first network may simply be a "no-operation."

Next, the routine 300 proceeds to operation 308, where a secure channel is established between the source host computer 104A in the first network 220 and the target host computer 104B in the second network 222 to enable live migration communication between the host computers. As described above in regard to FIG. 2, a communication channel 210 may be established between the source host computer 104A and the target host computer 104B through the network tunnel 206 established between the first network 220 and the second network 222 in operation 302. However, this network tunnel 206 alone may not provide for a secure end-to-end channel for live migration between the replication engines 204 and/or VMMs 102 on the primary and target host computers 104A, 104B. In addition, it may not be possible to establish the network tunnel 206 if the first network 220 and the second network 222 have overlapping address spaces.

It will be appreciated that the replication engines 204 that implement the live migration protocol(s) may be on disparate networks with potentially different address spaces. If the network tunnel 206 established between the first network 220 and the second network 222 has valid substrate network-addressable end points on the source side and the target side, then no additional tunneling infrastructure may be needed. The replication engine 204 on the source host computer 104A may be configured to use the substrate-endpoint of the network tunnel 206 in the first network 220, while the replication engine in the target host computer 104B is configured to use the substrate-endpoint of the network tunnel in the second network 222. However, depending on the capabilities and configurations of the first network 220 and the second network 222, this setup may create a security hole in the substrate networks on one or both sides of the network tunnel 206. In this case, additional tunnel infrastructure may be desired between the host computers to secure the live migration communication over the entire communication channel 210. According to another embodiment, a triple-tunnel may be established connecting the replication engines 204 and VMMs 102 on the primary and target host computers 104A, 104B.

Figure 4:
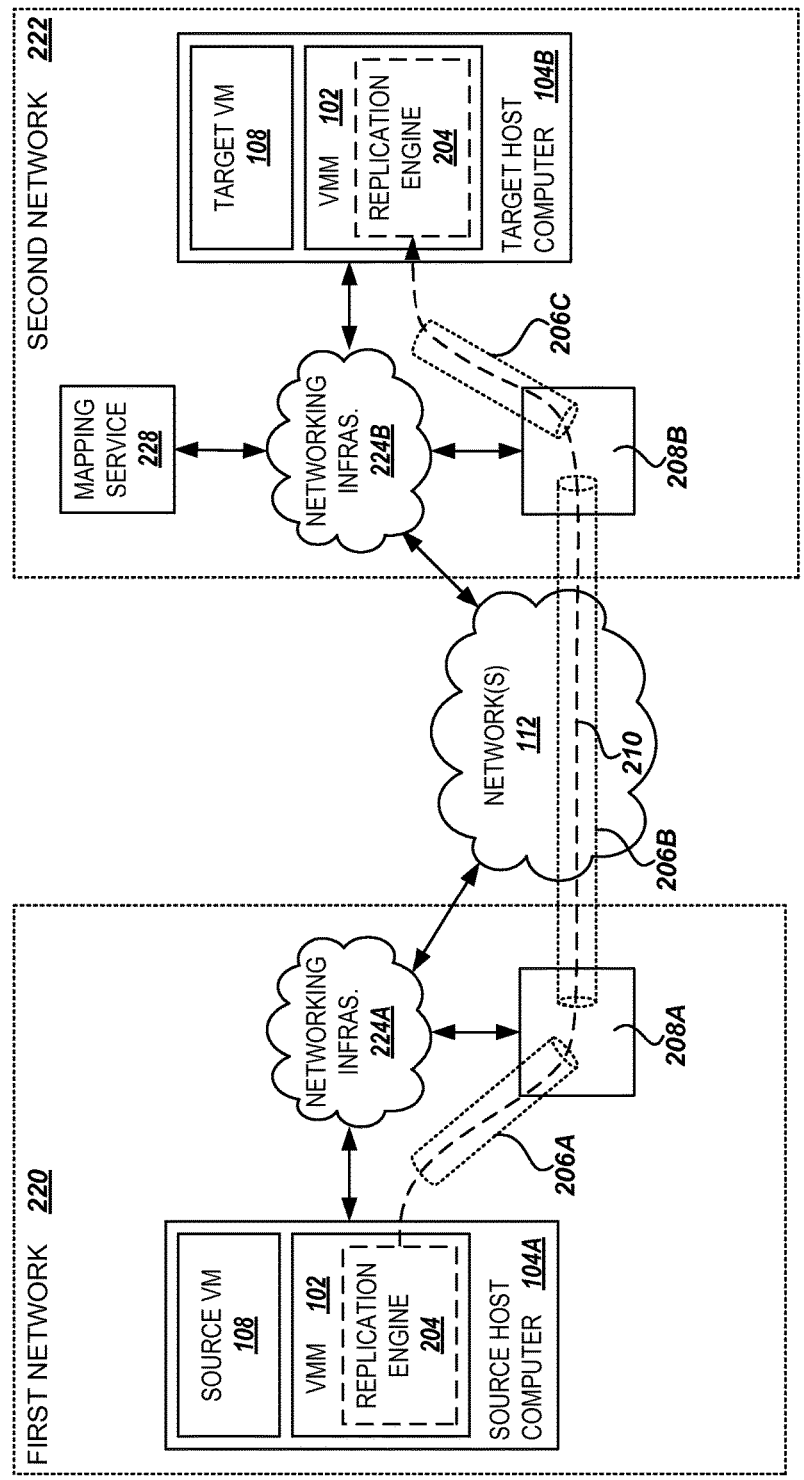
FIG. 4 is a block diagram showing further aspects of the migration of the virtual machine from the source host computer to the target host computer in the illustrative hybrid network environment, according to embodiments presented herein.

As shown in FIG. 4, the triple-tunnel may comprise a first network tunnel 206A established between the source host computer 104A and the border device 208A in the first network 220, a second network tunnel 206B established between the border devices 208A and 208B of the first network and the second network 222, as described above in regard to operation 302, and a third network tunnel 206C between the border device 208B in the second network and the target host computer 104B. The communication channel 210 may then be established between the source host computer 104A and the target host computer 104B through the three network tunnels 206A, 206B, and 206C. Network packets from the source host computer 104A arriving at border device 208A through network tunnel 206A are configured to be sent through network tunnel 206B to border device 208B. Packets arriving at border device 208B through network tunnel 206B are forwarded through tunnel 206C to the target host computer 104B. A similar technique is utilized to route return traffic from the target host computer 104B to the source host computer 104A.

According to some embodiments, the triple-tunnel may be established by first selecting an unused physical IP address, or a substrate IP, from the networking infrastructure 224B in the second network 222 (the virtual network), and then selecting an unused substrate IP address from the network infrastructure 224A of the first network 220 (the private network). It will be noted that these two selected substrate IPs may be in entirely different IP address spaces, or the substrate address spaces of the two networks may overlap.

Next, a network tunnel 206B is established between the border devices 208A and 208B of the first and second networks 220, 222. The unused substrate IPs from the first network 220 and second network 222 are then assigned to the source host computer 104A and target host computer 104B, respectively, and the networking infrastructures 224A, 224B of the first network 220 and the second network 222 are configured so that traffic to the unused substrate IP addresses are redirected to the corresponding gateway devices, such as the border devices 208A, 208B, on the networks.

Since the substrate address spaces of the first network 220 and second network 222 could overlap, the network tunnel 206B in this scenario may be a "contained," substrate-level tunnel. Network packets arriving at border device 208B through network tunnel 206B are forwarded by the border device over network tunnel 206C to the target host computer 104B, and not allowed to enter the substrate network of the second network 222. Similarly, return traffic arriving at border device 208A through network tunnel 206B is forwarded over network tunnel 206A to the source host computer 104B, and not allowed to enter the substrate network of the first network 220.

In further embodiments, an overlay IP address is chosen from the second network 222 (the virtual network) and the first network 220 (the private network) so that the overlay IP address is part of the overlay network implemented by the corresponding networking infrastructures 224A, 224B. For example, if the address space 10.10/16 belongs to the overlay network in the second network 222, and the address space 10.11/16 belongs to the overlay network of the first network, then an IP address of 10.10.0.43 could be chosen for the second network 222 and an IP address of 10.11.0.55 could be chosen for the first network 220. The chosen IP addresses may be "portal" IP addresses that are used specifically for migration of the virtual machine 108. The portal addresses will be blocked for further use until the migration operation is complete. Alternatively, the overlay IP range in both the first network 220 and the second network 222 may be extended in order to create unused IPs in both networks, if necessary. In addition, any firewall rules related to overlay network communications are disabled for the portal IP addresses.

Next, the mapping service 228 pushes mappings to the gateway device(s) in the second network 222 such that the portal overlay IP in the second network 222 will be terminated by target host computer 104B participating in the migration operation. Similarly, the equivalent service in the networking infrastructure 224A will configure the corresponding gateway device(s) so that the overlay IP in the first network 220 is terminated at the source host computer 104A. In this way, any migration traffic between the source host computer 104A with the portal overlay IP address in the first network 220 and the target host computer 104B with the portal overlay IP address in the second network 222 will be forwarded by the corresponding gateway devices as if it were regular overlay network traffic, but the VMMs 102 on the respective host computers (or equivalent) will intercept the traffic. This methodology has the added advantage of not requiring redirection of the substrate IPs, as in the embodiment described above.

From operation 308, the routine 300 proceeds to operation 310, where the live migration process is performed to migrate the state of the virtual machine 108 from the source host computer 104A to the target host computer 104B, as described above in regard to FIG. 2. According to embodiments, the replication engine 204 copies the dirty pages of guest memory and the final state of the CPU, virtual machine, network connections, etc. from the source host computer 104A to the target host computer 104B over the secure communication channel 210 established in operation 308.

The routine proceeds from operation 310, to operation 312, where the network address(es) of the virtual machine 108 are transferred to the now fully migrated virtual machine 108 on the target host computer 104B so that the virtual machine may be resumed in the last state of the virtual machine, including all open/active network connections. For example, as described above in regard to FIG. 2, the VMM 102, replication engine 204, or other migration module on the source host computer 104A may invoke the FastMigrate API during the migration process, causing the mapping service 228 to update the overlay IP mappings for the IP/MAC addresses for the virtual machine 108 to point to the target host computer 104B. The address translation modules 226 on the host computers 104 that are operating in the "fast poll" mode may then receive the new mappings. After the completion of the migration of the virtual machine 108 from the source host computer 104A to the target host computer 104B, either the VMM 102 and/or replication engine 204 on the source host computer 104A or another migration management module in the first or second networks 220, 222 may invoke the CompleteNetworkMigration API. This may cause the mapping service 228 to send a notification message to the affected host computers 104 that the fast IP migration is complete, such that the address translation modules 226 may discontinue the "fast poll" mode and return to normal operation.

During the delay that may occur while the networking environment is reconfigured accordingly, a redirection scheme may be established in the first network 220 that redirects network packets addressed to the network address(es) of the virtual machine 108 across the network tunnel 206 to the second network 222, and to the target host computer 104B, where the newly migrated virtual machine may receive and process the packets. Once the network configuration changes are complete to effect the transfer of the network address(es) to the virtual machine 108 on the target host computer 104B, then the redirection scheme may be dismantled.

From operation 312, the routine 300 proceeds to operation 314, where the fully migrated virtual machine 108 on the target host computer 104B is resumed from the replicated state in order to begin servicing application service requests from end users in the first and/or second networks 220, 222, according to embodiments. From operation 310, the routine 300 ends. In some embodiments, before performing the routine 300 described above, a pre-migration compatibility check may be performed to determine if live migration is possible between the source host computer 104A and the target host computer 104B. The pre-migration compatibility check may be performed by the virtual machine manager 102 and/or the replication engine 204 executing on the source host computer 104A, for example. The pre-migration compatibility check may determine hardware and virtual machine 108 compatibility between the source and target host computers 104A, 104B; compatibility between virtualization modes of the host computers, e.g. paravirtualization versus hardware virtualization, for example; compatibility between the features of the respective virtual machine managers 108, e.g. support for specific paravirtualization calls, for example; commonly supported live migration protocols; and the like. It will be appreciated that routines substantially similar to the routine 300 described above may be utilized to migrate virtual machines 108 in other configurations, including the migration of a virtual machine from a host computer in a private network to a host computer in a VPC, the migration of a virtual machine from a host computer in a public network to a host computer in the private network, and the like.

Figure 5:
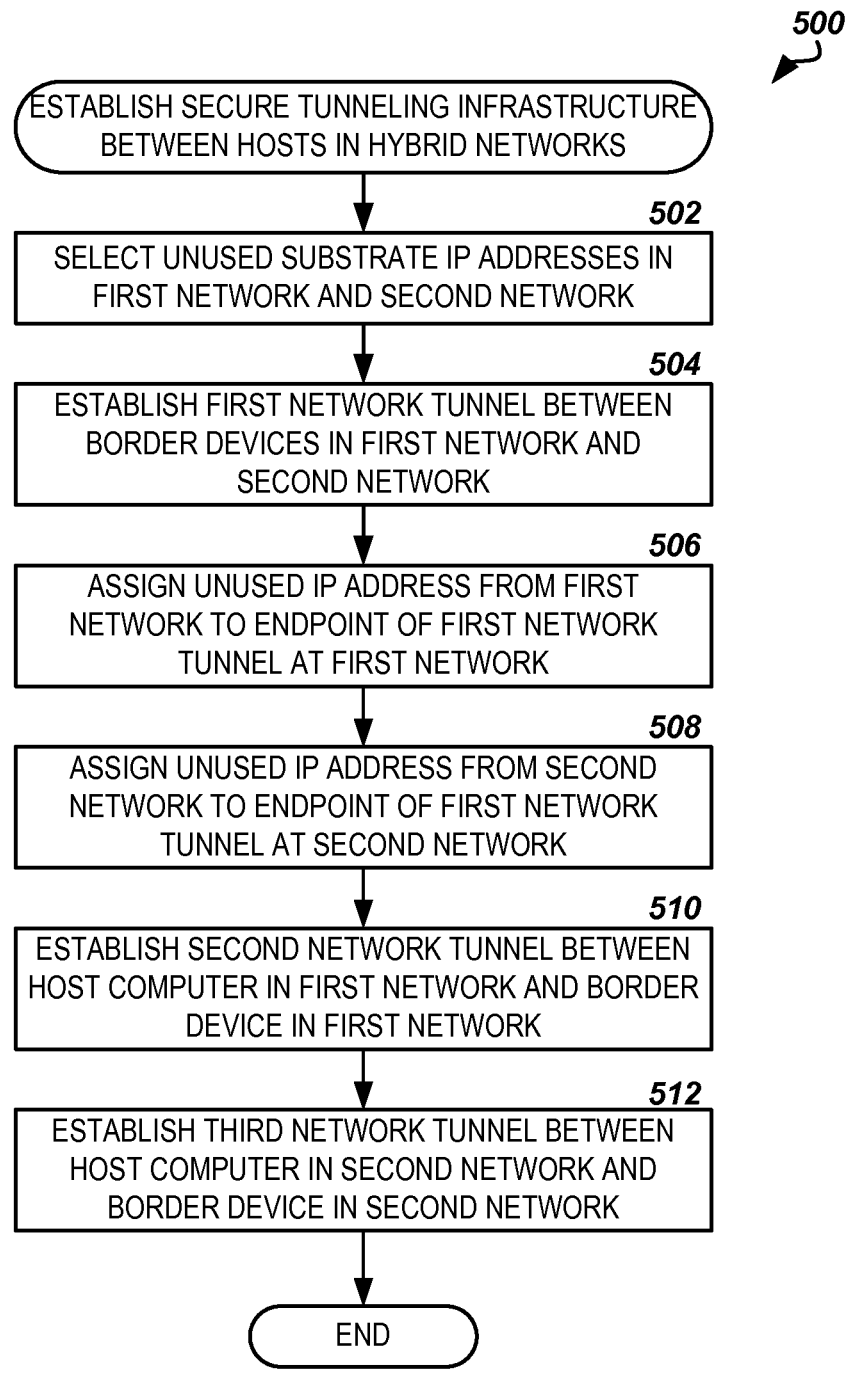
FIG. 5 is a flow diagram showing one method for establishing a secure tunnel infrastructure between hosts in a hybrid network environment, according to embodiments described herein.

FIG. 5 illustrates one routine 500 for establishing a secure tunnel infrastructure between hosts in a hybrid network environment, such as the triple-tunnel infrastructure described above in regard to FIG. 4. While the triple-tunnel infrastructure is described herein for establishing a secure tunneling infrastructure for the communication channel 210 used in the live migration between the source host computer 104A in the first network 220 to the target host computer 104B in the second network 222, it will be appreciated that the triple-tunnel infrastructure may be utilized to establish a secure channel between hosts in any two, disparate networks, especially when the respective substrate networks have different address spaces and/or are separated by an unsecure public network, such as the network(s) 112 described above. The routine 500 may be utilized when communication between hosts on the substrate networks of the first network 220 and the second network 222 is required and no overlay network or other virtual networking architecture is in place. The routine 500 may be performed by any combination of devices, administrative components, and modules that make up the respective networking infrastructures 224 of the first network 220 containing the first host computer 104A and the second network 222 containing the second host computer 104B.

The routine 500 begins at operation 502, where an unused physical IP address, or a substrate IP, from the networking infrastructure 224B in the second network 222 and an unused substrate IP address from the network infrastructure 224A of the first network 220 are selected. As described above, the two selected substrate IP addresses may be in entirely different IP address spaces, or the substrate address spaces of the two networks may overlap. The routine 500 proceeds from operation 502, to operation 504, where the appropriate network tunnel 206B through the public network(s) 112 is established between the first network 220 and the second network 222. For example, as described above in regard to operation 302, a border device 208A in the first network 220 may establish a network tunnel 206 over the network(s) 112 with a similar border device 208B in the second network 222 using any number of tunneling protocols known in the art. According to embodiments, the network tunnel 206B may be a "contained," substrate-level tunnel, such that network packets arriving at border device 208B through network tunnel 206B are forwarded by the border device over network tunnel 206C to the target host computer 104B, and not allowed to enter the substrate network of the second network 222. Similarly, return traffic arriving at border device 208A through network tunnel 206B is forwarded over network tunnel 206A to the source host computer 104B, and not allowed to enter the substrate network of the first network 220.

From operation 504, the routine 500 proceeds to operation 506, where the unused substrate IP address selected from the first network 220 is assigned to the tunnel endpoint of the network tunnel 206B in the first network. Similarly, at operation 508, the unused substrate IP address selected from the second network 222 is assigned to the tunnel endpoint of the network tunnel 206B in the second network. Next, at operation 510, a network tunnel 206A is established between the first host computer 104A and the border device 208A managing the endpoint of the network tunnel 206B in the first network 220. Similarly, at operation 512, a network tunnel 206C is established between the second host computer 104B and the border device 208B managing the endpoint of the network tunnel 206B in the second network 222. From operation 512, the routine 500 ends.

Figure 6:
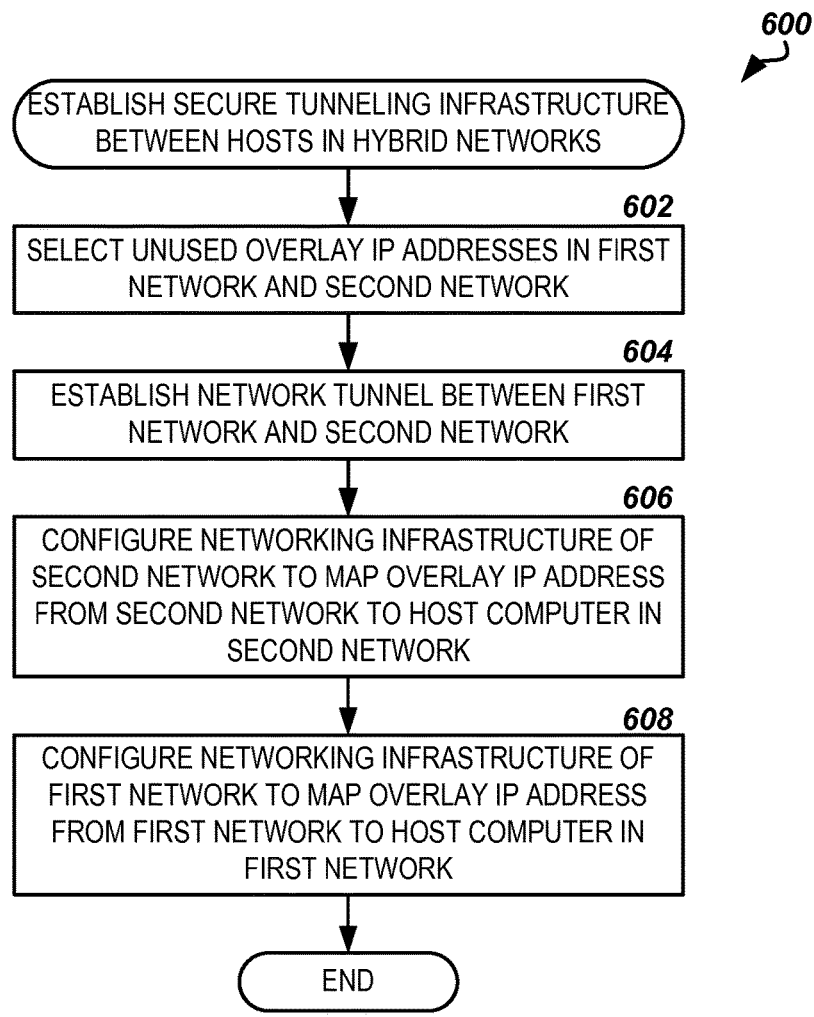
FIG. 6 is a flow diagram showing another method for establishing a secure tunnel infrastructure between hosts in a hybrid network environment, according to embodiments described herein.

FIG. 6 illustrates another routine 600 for establishing a secure tunnel infrastructure between hosts in a hybrid network environment. The routine 600 may be utilized when communication between hosts in the first network 220 and the second network 222 is required and overlay networks are implemented by the respective networking infrastructures 224A, 224B having the same or compatible address spaces. The routine 600 may be performed by any combination of devices, administrative components, and modules that make up the respective networking infrastructures 224 of the first network 220 containing the first host computer 104A and the second network 222 containing the second host computer 104B.

The routine 600 begins at operation 602, where unused overlay IP addresses are chosen from the first network 220 and the second network 222 so that the overlay IP addresses are part of the overlay networks implemented by the respective networking infrastructures 224A and 224B. For example, if the address space 10.10/16 belongs to the overlay network in the second network 222, and the address space 10.11/16 belongs to the overlay network of the first network 220, then an IP address of 10.10.0.43 could be chosen for the second network and an IP address of 10.11.0.55 could be chosen for the first network. The chosen IP addresses may be "portal" IP addresses that are used specifically for communication between the first host computer 104A and the second host computer 104B, as in the live migration of the virtual machine 108 described above in regard to FIG. 3. Alternatively, the overlay IP range in both the first network 220 and the second network 222 may be extended in order to create unused IP addresses in both networks, if necessary. The routine 600 proceeds from operation 602, to operation 604, where the appropriate network tunnel 206B through the public network(s) 112 is established between the first network 220 and the second network 222, as discussed above in regard to operation 504. In addition, the networking infrastructure 224A of the first network 220 is configured to redirect traffic for address space of the second network 222, including the overlay IP address selected from the second network, to the border device 208A in the first network. Similarly, the networking infrastructure 224B of the second network 222 is configured to redirect traffic for the overlay IP address selected from the first network 220, to the border device 208B in the second network.

From operation 604, the routine 600 proceeds to operation 606, where the mapping service 228 pushes mappings to the border device 208B and other gateway device(s) in the second network 222 such that the portal overlay IP in the second network 222 will be terminated by second host computer 104B. Similarly, at operation 608, the equivalent service in the networking infrastructure 224A of the first network 220 will configure the corresponding border device 208A and other gateway device(s) so that the overlay IP in the first network 220 is terminated at the first host computer 104A. In this way, any traffic between the first host computer 104A with the overlay IP address in the first network 220 and the second host computer 104B with the overlay IP address in the second network 222 will be forwarded by the corresponding border devices 208A, 208B as if it were regular overlay network traffic, but the VMMs 102 on the respective host computers (or equivalent) will intercept the traffic. This methodology has the added advantage of not requiring redirection of the substrate IP addresses, as in the embodiment described above in regard to FIG. 5. From operation 608, the routine 600 ends.

Figure 7:
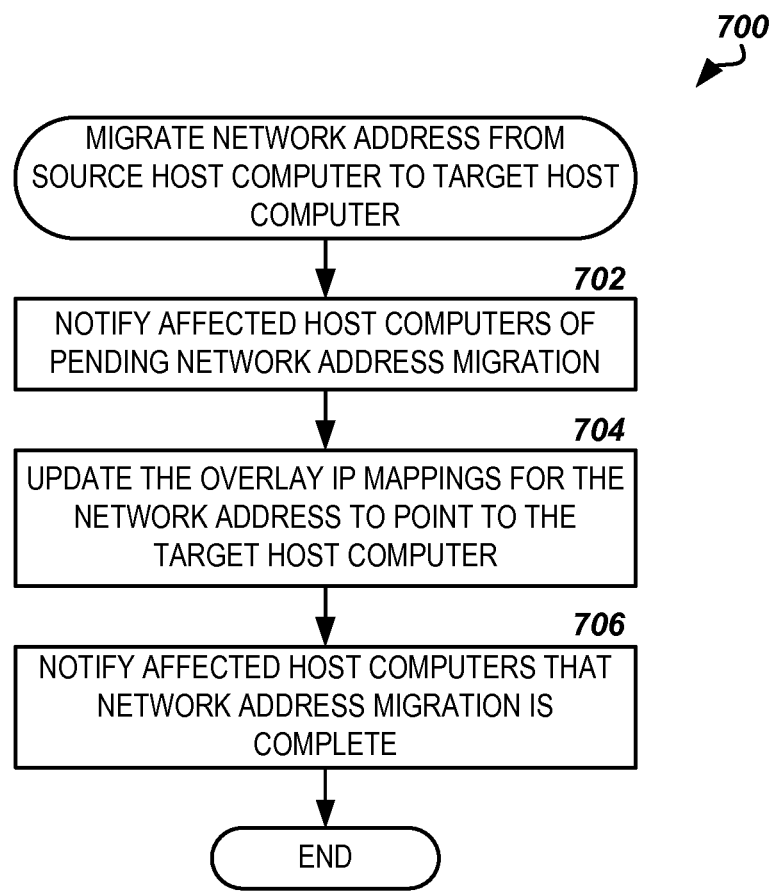
FIG. 7 is a flow diagram showing one method for performing fast IP migration between host computers in a hybrid network environment, according to embodiments described herein.

FIG. 7 illustrates one routine 700 for performing fast IP migration between hosts in a hybrid network environment, according to embodiments presented herein. While the fast IP migration technique is described herein for migrating an IP and/or MAC address assigned to a virtual machine 108 on the source host computer 104A to target host computer 104B in conjunction with a live migration of the virtual machine, it will be appreciated that the fast IP migration technique may be utilized to migrate network address(es) between hosts in any two, disparate networks, such as the failover of a primary host computer in a private network to a redundant secondary host computer in a public network or VPC, for example. The routine 700 may be performed in part by the mapping service 228 described above in regard to FIG. 2 in conjunction with any combination of devices, administrative components, and management modules that make up the respective networking infrastructures 224 of the first network 220 containing the source host computer 104A and the second network 222 containing the target host computer 104B.

The routine 700 begins at operation 702, where the mapping service 228 sends a notification message to all potentially affected host computers 104 that informing the host computers of the upcoming network address migration. This may be performed in response to the administrative components or management modules coordinating the migration of the network address(es) from the source host computer 104A to the target host computer 104B invoking the PrepareNetworkMigration API provided by the mapping service 228, described above in regard to FIG. 2. In general, the potentially affected host computers 104 may comprise the set of host computers hosting virtual machines in the same VPC or virtual network, in the case of the live migration of a virtual machine 108 described above. Additional host computers 104 may be included if advanced features, such as "VPC to VPC" portals, are supported.

The address translation modules 226 on the host computers 104 that are notified of the upcoming network address migration may prepare for the fast IP migration by entering a "fast poll" mode in which the host computer polls the mapping service 228 for mapping updates on a frequent basis, such as every 50 milliseconds. Alternatively, the host computers 104 can utilize a "long poll" methodology to poll for changes in the mappings from the mapping service 228. In a further embodiment, host computers 104 hosting virtual machines 108 in the VPC or virtual network may remain in "fast poll" mode continuously.

When migrating network address(es) from the source host computer 104A to the target host computer 104B in a hybrid network environment, such as that shown in FIG. 2, additional steps may be necessary. For example, if the first network 220 implements an internalized networking infrastructure 224A that supports differing fast IP migration techniques, then calls to the PrepareNetworkMigration API made to the mapping service 228 may be split into internal and external calls. The internal call may be handled by the mapping service 228 in the second network 222 (the virtual network/VPC), while the external call is sent to the equivalent service provided by the networking infrastructure 224A in the first network 220 (the private network) via appropriate middleware. This may result in the host computers 104 and any gateway device(s) of the second network 222 operating in "fast poll" mode, as described above, while the hosts and gateway device(s) of the first network 220 may be placed in a similar fast poll mode. It will be appreciated that other techniques could be used instead of or in addition to the fast poll mode described herein, such as a "long poll" mode. If the first network 220 implements a V-LAN, then the external API call to the networking infrastructure 224A of the first network may simply be a "no-operation."

From operation 702, the routine 700 proceeds to operation 704, where the mapping service 228 updates the overlay IP mappings for the IP/MAC address(es) being migrated to point to the target host computer 104B. This may be performed in response to the administrative components or management modules coordinating the migration of the network address(es) from the source host computer 104A to the target host computer 104B invoking the FastMigrate API, further described above. The address translation modules 226 on host computers 104 that are operating in the "fast poll" mode may then receive the new mappings very quickly. In another embodiment, the mapping service 228 may also "push" the changed mappings to the host computers 104

As above, the call to the FastMigrate API call may result in an external call to the networking infrastructure 224A of the first network 220 (the private network) that enables redirection of the networking address(es) of the source host computer 104A towards the gateway, and an internal call that causes the mapping service 228 to push out mapping information that will enable the gateway device(s) in the second network 222 (the virtual network or VPC) to accept networking packets for the IP/MAC addresses and forward them to the target host computer 104B. As a result of the FastMigrate API call, the gateway configuration between the first and second networks 220, 222 may also be changed appropriately. For example, if the gateway device(s) of the second network 222 (the virtual network or VPC) are configured to receive packets for an IP address of 10.10.20.3, and the IP address is being migrated from the second network to the first network 220, then gateway device(s) of the first network (the private network) may be configured to receive traffic for the 10.10.20.3 address, and the gateway devices of the second network can be configured not to receive external traffic for the 10.10.20.3 overlay IP address.

As further described above, during the delay that may occur while the networking environment is reconfigured accordingly, a redirection scheme may be established in the first network 220 that redirects network packets addressed to the network address(es) being migrated across the network tunnel 206 to the second network 222, and to the target host computer 104B. Once the network configuration changes are complete to effect the migration of the network address(es) to the target host computer 104B, then the redirection scheme may be dismantled.

At some point subsequent to the FastMigrate API call, the administrative components or management modules coordinating the migration of the network address(es) from the source host computer 104A to the target host computer 104B may invoke the CompleteNetworkMigration API of the mapping service 228. This may cause the mapping service 228 to send a notification message to the affected host computers 104 that the network address migration is complete, as shown at operation 706. The completion notification message may cause the address translation modules 226 on the affected host computers 104 to discontinue the "fast poll" mode and return to normal operation, for example. From operation 706, the routine 700 ends.

Figure 8:
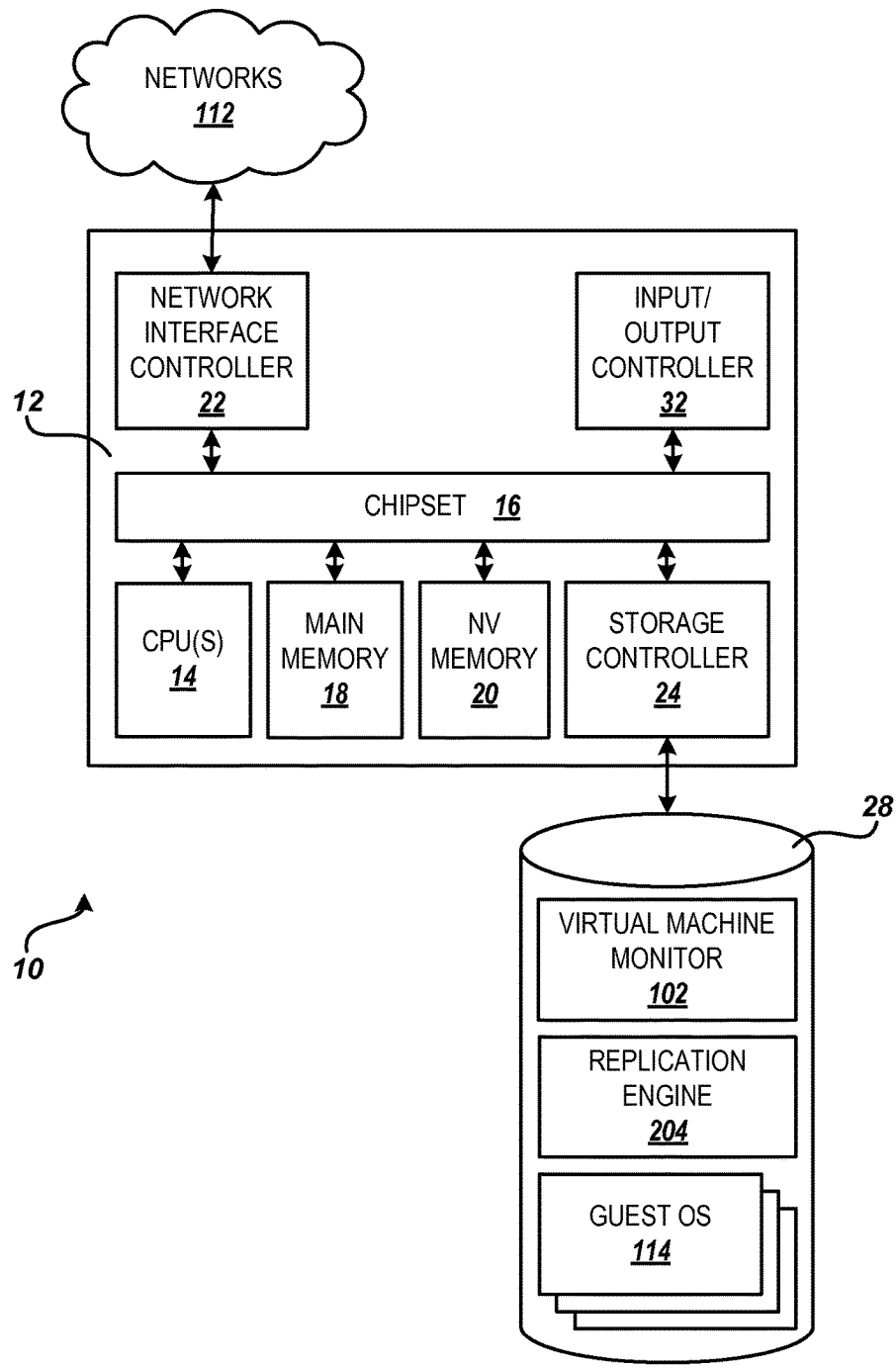
FIG. 8 is a computer architecture diagram showing an illustrative computer hardware architecture for computing devices described in embodiments presented herein.

FIG. 8 shows an example computer architecture 10 for a computer 12 capable of executing the software components described herein for performing live migration of virtual machines in a hybrid network environment, in the manner presented above. The computer architecture 10 shown in FIG. 8 illustrates a conventional server computer, workstation, desktop computer, laptop, PDA, electronic book reader, digital wireless phone, network appliance, set-top box, or other computing device, and may be utilized to execute any aspects of the software components presented herein described as executing on the host computers 104 or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a main memory 18 of the computer 12, such as a random access memory. The chipset 16 may further provide an interface to a non-volatile memory 20, such as a read-only memory ("ROM") or non-volatile RAM ("NVRAM") for storing basic routines that help to startup the computer 12 and to transfer information between the various components and devices. The non-volatile memory 20 may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as remote storage devices 116, databases 118, other host computers 120, and the like across the networks 112 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the main memory 18, non-volatile memory 20, and mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store software programs executed on the computer 12, such as the VMM 102, the replication engine 204, one or more guest OSs 114, and other applications, each of which was described above in regard to FIG. 1. The mass storage device 28 may further store other system or application programs and data utilized by the computer 12. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 300, 500, 600, and 700 for performing live migration of virtual machines in a hybrid network environment, as described above in regard to FIGS. 3 and 5-7.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 8, may include other components that are not explicitly shown in FIG. 8, or may utilize an architecture completely different than that shown in FIG. 8.

Based on the foregoing, it should be appreciated that technologies for performing live migration of virtual machines in a hybrid network environment are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
    in conjunction with a migration of a virtual machine from a first host computer in a first network to a second host computer in a second network,
        notify a third host computer hosting one or more virtual machine instances to support a first mapping that maps a network address associated with the virtual machine to a network address associated with the first host computer and a second mapping that maps the network address associated with the virtual machine to a network address associated with the second host computer, wherein the third host computer
        receives network packets addressed to the network addresses associated with the first host computer and the second host computer, and substantially simultaneously sends a copy of the network packets addressed to the network addresses to both the first host computer and the second host computer;
        determine completion of the migration of the virtual machine from the first host computer to the second host computer; and
        in response to determining completion of the migration of the virtual machine, notify the third host computer to support the second mapping and discontinue support of the first mapping.

2. The computer-readable storage medium of claim 1, wherein notifying the third host computer to support the first mapping and the second mapping for the network address further causes the third host computer to accept network packets addressed to the network address associated with the virtual machine from both the first host computer and the second host computer.

3. The computer-readable storage medium of claim 2, wherein before the migration of the virtual machine is complete, network packets addressed to the network address arriving at the first host computer are forwarded to the virtual machine and network packets addressed to the network address arriving at the second host computer are dropped, and wherein after the migration of the virtual machine is complete, network packets addressed to the network address arriving at the second host computer are forwarded to the migrated virtual machine and network packets addressed to the network address arriving at the first host computer are dropped.

4. The computer-readable storage medium of claim 1, wherein a sequence number is added to an overlay header of network packets addressed to the network address associated with the virtual machine to minimize a chance of duplicate packets being forwarded to the virtual machine on the second host computer.

5. The computer-readable storage medium of claim 1, wherein the second host computer queues a number of last received network packets addressed to the network address associated with the virtual machine to minimize a chance of packet loss during completion of the migration of the virtual machine.

6. The computer-readable storage medium of claim 1, wherein
    the first network and the second network are connected by a network tunnel between a first border device in the first network and a second border device in the second network, and
    wherein preparing the first network and the second network further comprises configuring a networking infrastructure of the first network such that network packets addressed to the network address associated with the virtual machine sent by host computers to the second host computer are redirected to the first border device and across the network tunnel to the second network.

7. The computer-readable storage medium of claim 1, wherein the first and second notifying operations are performed by calls to an application programming interface ("API") by a replication engine module performing a migration of a virtual machine from the first host computer to the second host computer.

8. A system for migrating a network address between a first host computer in a private network and a second host computer in a virtual private network, the system comprising:

one or more processors; and
a main memory coupled to the one or more processors and configured with one or more software modules that cause the one or more processors to
notify a third host computer of an upcoming migration of the network address to cause the third host computer to support a first mapping that maps the network address to a network address associated with the first host computer and a second mapping that maps the network address to a network address associated with the second host computer, wherein the third host computer
receives network packets addressed to the network addresses associated with the first host computer and the second host computer, and
substantially simultaneously sends a copy of the network packets to both the first host computer and the second host computer,
reconfigure networking infrastructures of the private network and the virtual private network to effect transfer of the network address from the first host computer in the private network to the second host computer in the virtual private network,
determine completion of the migration of the network address from the first host computer to the second host computer, and
notify the third host computer that the migration of the network address is complete to cause the third host computer to discontinue support for the first mapping and continue support for the second mapping.

9. The system of claim 8, wherein notifying the third host computer of the upcoming migration of the network causes the third host computer to begin periodically polling a mapping service for mapping updates, and wherein notifying the third host computer that the migration of the network address is complete causes the third host computer to stop periodically polling the mapping service.

10. The system of claim 8, wherein supporting both the first mapping and the second mapping for the network address causes the third host computer to accept network packets addressed from the network address from both the first host computer and the second host computer.

11. The system of claim 8, wherein reconfiguring the networking infrastructures of the private network and the virtual private network comprises updating overlay IP mappings in the virtual private network for the network address being migrated to point to the second host computer.

12. The system of claim 8, wherein the first notifying, reconfiguring, and second notifying operations are performed by calls to an application programming interface ("API") by a replication engine module performing a migration of a virtual machine from the first host computer to the second host computer.

13. The system of claim 12, wherein each API call is split into an internal call for the networking infrastructure of the virtual private network and an external call for the networking infrastructure of the private network.

14. The system of claim 12, further comprising: establishing a redirection of network packets addressed to the virtual machine received at the first host computer across a network tunnel between the private network and the virtual private network and to the second host computer for consumption by the virtual machine; and after completion of the reconfiguration of the networking infrastructures of the private network and the virtual private network to effect migration of the network address, tearing down the redirection.

15. A computer-implemented method, comprising:
in conjunction with a migration of a virtual machine from a first host computer in a first network to a second host computer in a second network,
notifying a third host computer hosting one or more virtual machine instances to support a first mapping that maps a network address associated with the virtual machine to a network address associated with the first host computer and a second mapping that maps the network address associated with the virtual machine to a network address associated with the second host computer, wherein the third host computer
receives network packets addressed to the network addresses associated with the first host computer and the second host computer, and
substantially simultaneously sends a copy of the network packets to both the first host computer and the second host computer;
determining completion of the migration of the virtual machine from the first host computer to the second host computer; and
in response to determining completion of the migration of the virtual machine, notify the third host computer to support the second mapping and discontinue support of the first mapping.

16. The computer-implemented method of claim 15, wherein notifying the third host computer comprises:
calling a first application programming interface ("API") of a mapping service in the second network to notify the third host computer of the upcoming migration of the network address, the mapping service maintaining mappings between network addresses associated with virtual machines to network addresses associated with host computers.

17. The computer-implemented method of claim 16, wherein execution of the second API call comprises updating the mappings to map the network address being migrated to the network address associated with the second host computer.

18. The computer-implemented method of claim 16, wherein notifying the third host computer to support the second mapping comprises calling a third API of the mapping service to notify the third host computer that the migration of the network address is complete.

19. The computer-implemented method of claim 18, wherein execution of the third API call causes the third host computer to stop polling the mapping service for mapping updates and to return to normal operation.

20. The computer-implemented method of claim 18, further comprising calling a fourth API of the mapping service to abort the migration of the network address, wherein execution of the fourth API call causes the reconfiguration of the networking infrastructures of the first network and the second network made by the execution of the second API to be rolled back.

21. The computer-implemented method of claim 16, further comprising:
establishing a redirection of network packets addressed to the virtual machine received at the first host computer across a network tunnel between the first network and the second network and to the second host computer for consumption by the virtual machine; and
after completion of the reconfiguration of the networking infrastructures of the first network and the second network to effect the migration of the network address, tearing down the redirection.

22. The computer-implemented method of claim 16, wherein
- at least one of an overlay IP address or an overlay MAC address, an ID of the first host computer, and an ID of the second host computer are provided to the first API call,
- wherein the first API call returns an identifier of the migration of the network address, and
- wherein the identifier of the migration is provided to the second API call.

23. The computer-implemented method of claim 16, wherein
- the first network and the second network are connected by a network tunnel between a first border device in the first network and a second border device in the second network, and
- wherein reconfiguring the networking infrastructure in the first network to effect transfer of the network address comprises configuring the networking infrastructure such that network packets addressed to the network address sent by host computers to the second host computer are redirected to the first border device and across the network tunnel to the second network.

24. The method of claim 16, further comprising calling, by the VMM of the first host computer, a second API of the mapping service to reconfigure networking infrastructures of the first network and the second network to effect transfer of the network address from the first host computer in the first network to the second host computer in the second network, wherein each of the first API call and the second API call generates an internal call to the mapping service in the second network and an external call sent to another service in the first network.

* * * * *